Figure 1:
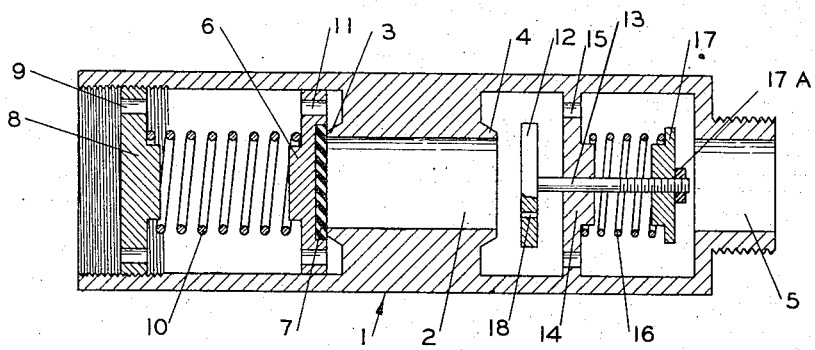

Aug. 22, 1944. A. D. KRUGLER 2,356,410

CONTROLLED CYCLE RELIEF VALVE

Filed Jan. 3, 1942

INVENTOR
A. D. KRUGLER

Patented Aug. 22, 1944

2,356,410

UNITED STATES PATENT OFFICE 2,356,410

CONTROLLED CYCLE RELIEF VALVE

Allen D. Krugler, Bartlesville, Okla., assignor to Phillips Petroleum Company, a corporation of Delaware Application January 3, 1942, Serial No. 425,560

5 Claims. (Cl. 277—42)

My invention relates to an improved type of pressure relief valve.

All pop type relief valves have a tendency to operate in a cyclic manner. Specifically, a particular pressure is required on their inlet sides to cause opening of the valve, and this pressure must recede by some amount to arrive at some lower pressure which will allow the valve to close again. The difference between the popping pressure and the reseating pressure is commonly termed "blowdown."

In some applications, the amount of blowdown is of little significance; in others, this factor is of extreme importance. For example, there are many large storage tanks and tank cars used in the manufacture, transportation and utilization of liquefied petroleum gases. In addition to whatever quantities of liquid these tanks may at any time contain, large quantities of vapor are also contained, the whole content being under a high vapor pressure which varies in accordance with the temperature. All such storage containers are protected by pressure relief valves and most states have laws requiring such protection.

Since the liquids and vapors referred to above are of an inflammable nature, it is important their escape to the atmosphere be prevented by all possible means. However, if their pressures for any reason should rise to a point which imperils the storage vessel structure, then release of some of the contents is required, this usually being accomplished automatically by a pop type relief valve which discharges to the atmosphere. It is obvious that such a pop valve should have a minimum amount of blowdown so that no more gas will be lost to the atmosphere than is necessary to protect the tank. This is an economic consideration as well as one of safety, since excessive escape of gas represents a loss of valuable products and at the same time creates a fire or explosion hazard.

As a result of this situation, much attention has been devoted to the matter of relief valve blowdown characteristics, and several refinements have resulted from this work. Most designers have approached the problem from the angle of restricting the outlet of the relief valve, thus creating a back pressure on the relief valve to aid in reseating. In some cases the outlet from the valve has been reflexed, so that the discharging gas will impinge against the downstream side of the valve disc and so aid in reseating the valve.

In all cases, the modifying element that is intended to aid in reseating the valve proper is either attached mechanically to the valve stem, or is a part of the valve disc proper. In either case, the choking or modifying element operates as a direct mechanical function of the valve lift, and the operation of the two elements is always in unison.

The determination of the best proportion and location of these supplemental control elements is a critical matter, and one which requires a great deal of experiment in order to get the desired result. These experiments are usually made by trial and error methods, and different arrangements must be developed to cover different situations of use.

One device with which I am familiar employed an adjustable choke sleeve on the outlet end of the valve by means of which the degree of back pressure imposed could be varied. By this means, the degree of blowdown was supposed to be controllable or varied at will to suit the user's requirements. The adjustment was found to be so critical, however, that the setting for a given performance was very difficult to make and was subject to wide variation in results after the setting was made.

My improvement embodies two separate and independent units; however, they cooperate to produce the desired result in an unexpected and reliable manner. The device has novel utility in the storage and transportation of liquefied petroleum gases in avoidance of substantial loss of the valuable product while allowing normal operation of the relief valve to relieve the system from dangerously high pressures. While my device may be adapted to all applications where a pop valve is required, as outlined in the above discussion, there is also a special application for which it is particularly well suited.

In unloading propane and butane tank cars, it has long been the practice to transfer the product from the car to a bulk plant storage tank by means of a liquid transfer pump. In the last few years, however, this operation has been accomplished in an improved manner by means of a pressure differential method which employs a gas compressor. In this case, vapor is taken from the top of one of the station tanks and pumped into the top of the tank car, the liquid outlet of which is piped back to the aforesaid station tank, or to a second such tank. The compressor thus provides the necessary pressure differential to flow the liquid from the car to storage.

There is one eventuality which must be guarded against in this method of transfer, however. The tank cars in use are equipped with conventional pop valves, and care must be taken to see that the pressure in the tank car is not raised by the compressor to a point high enough to pop the valve on the car.

To obviate this possibility in which a great loss of gas would occur through the tank car relief valve, it has been customary to apply a supplementary relief valve of smaller size at a point in the discharge line of the compressor. This valve is given a pop setting below that of the tank car relief valve, so as to prevent popping of the latter. Being smaller in size, a lesser amount of gas will be lost in the event of opening the supplementary valve, and serves to warn the operating personnel that pressure in the system is approaching that which will open the tank car valve. Necessary steps can be then taken to prevent such opening.

It is equally desirable, however, to prevent excessive escape of gas, even from the small warning valve. My controlled cycle relief valve would be ideal for this application, since a maximum saving of gas and elimination of fire hazard would be obtained by installing a small valve of this type in the unloading system. As far as the specific unloading problem above outlined is concerned, the replacement of the large and expensive valves in the tank cars with valves of my improved type would not be necessary.

From the above discussion, many objects and advantages are to be realized, some of which follow.

The broad object of my invention is to provide relief valve protection for pressure vessels with a minimum of hazard and loss due to the escape of inflammable gases during blowdown of the valve.

A more specific expression of the above broad object is to say that the pressure in a vessel is limited to a definite desired maximum value without subsequent excessive lowering of the pressure because of prolonged opening of the relief device.

It is an object to realize the above in a simple and reliable device whose components are widely understood as such.

It is an object to not only curtail the blowdown period of the relief valve, but to provide means of varying this factor to suit the particular requirements of a given application.

It is a further object of this invention to provide means to adjust the popping pressure and the reseating function independently of each other.

In the drawing, Figure 1 is a cross sectional view of the device forming the subject of this application.

Figure 2:
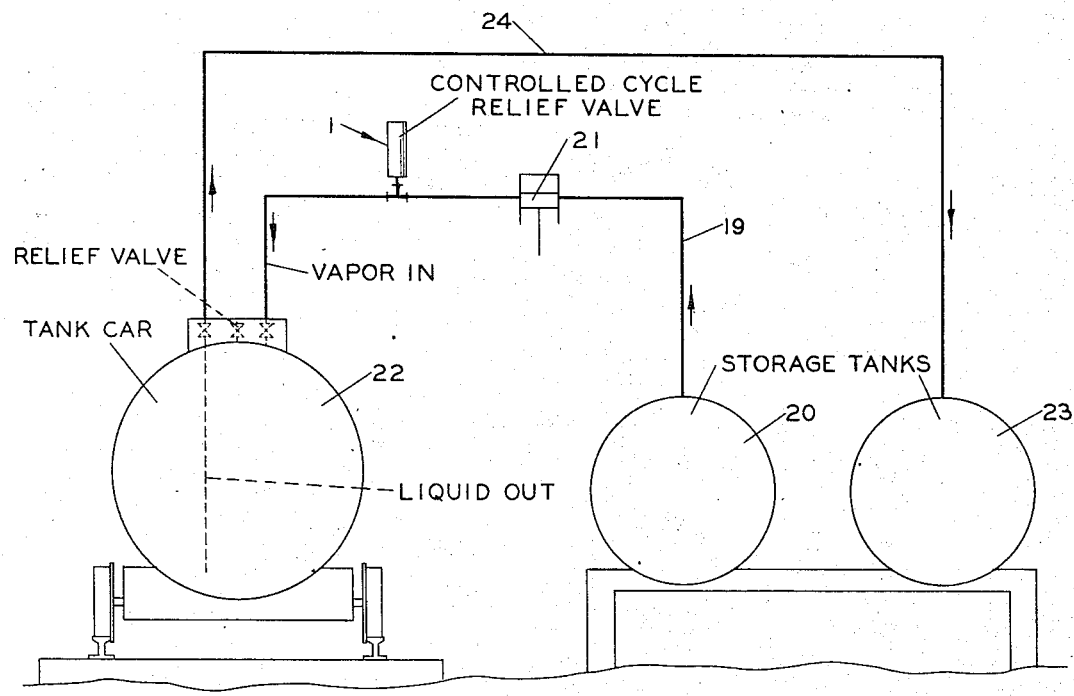

Figure 2 shows the piping diagram of a particular liquid transfer operation in which my valve may be used in a special way.

Referring to Figure 1 of the drawing, the numeral 1 delineates the relief valve body interiorally provided with a channel 2 terminating in nozzles or valve seats 3 and 4, respectively. The inlet end 5 of the valve body terminates in a portion which is exteriorally threaded for the purpose of being secured in a gas system, system for dispensing liquefied petroleum gases or any similar system where it is particularly desirable to conserve the fluid being transported. The opposite end of the valve body is formed with a chamber for the reception of a relief valve 6. The relief valve has a section 7 of synthetic rubber or other hydrocarbon resistant material. The relief valve chamber is interiorally threaded for the reception of an adjustable nut 8. The nut 8 is provided with passages 9 for the flow of gas. The relief valve 6 is normally maintained tightly sealed against the seat 3 by virtue of the coil spring 10, the compression of which is adjustable by the nut 8. Relief valve 6 is provided with apertures 11 to allow the escape of gases from the system to the atmosphere when the valve is in raised position. An excess flow valve 12 is disposed in a chamber in the inlet end of the valve body and is provided with a stem 13 slidable within a valve guide 14 formed in the interior of the chamber. The valve guide is provided with passages 15. The excess flow valve is normally held in open position by means of spring 16 which bears against a spring adjustment disc 17 threaded to the outer end of the valve stem. A lock nut 17A is screwed on to the valve stem over the adjustment disc to prevent rotation of the disc.

In operation, the relief valve is normally seated, but when the pressure in the system reaches a predetermined value, the valve will open allowing gas flow through the openings 15 around the periphery of the excess flow valve through the communicating channel 2, passages 11 and 9 to the atmosphere. Unobstructed flow of gas through the relief valve and around the excess flow valve will create a pressure differential across the excess flow valve, causing it to seat against the nozzle 4. When the excess flow valve is closed, shutting off flow to the communicating channel, the relief valve is accordingly closed by means of the coil spring 10. The excess flow valve is provided with a bleed hole 18 to permit a small flow of gas from the system to occur to the communicating channel 2 until a sufficient pressure is built up to allow the spring 16 to again open the excess flow valve. When this occurs, and in the event that the pressure in the system has not receded below the popping pressure of the relief valve, the relief valve will again be forced open and the cycle will be repeated.

In the above described operation the following facts are apparent. First, the relief valve 6 reacts after the fashion of any normal relief valve, having a definite popping pressure and another definite reseating pressure. However, the blowdown of pressure is confined to the communicating passage or chamber 2, by virtue of closure of the valve 12. Thus the blowdown characteristics of the valve 6 as such may be either good or bad without making any material difference in the overall result obtained. Even if the valve 6 required almost complete blowdown in order to reseat, the pressure in the whole storage vessel and related system would not suffer this excessive reduction because of the closure of valve 12.

Second, the operation of the valve will be intermittent, due to alternate opening and closing of the check valve 12. Further, the frequency of the intermittent cycle will be controlled by the size of the opening 18. In Figure 1, this opening has been shown to be small, and the period required for reopening of the check valve would, therefore, be relatively long. However, this opening may be made any size which may be desired and the frequency of the operation cycle will increase accordingly.

It is also pointed out here that the relief valve and check valve elements of my device may be interchanged as to position. In other words, the relief valve may be located nearest the pressure vessel and the check valve nearest the atmosphere, and the overall operation cycle would remain the same. The only difference would lie in the fact that the relief valve would be caused to reseat as a result of a back pressure generated on its outer side when the check valve closes, instead of a reduction of pressure on the inlet side immediately before the relief valve. In both cases, the relief valve closes because of a tendency to equalize pressures on opposing sides of the relief valve disc upon closure of the check valve.

Referring to Figure 2 of the drawing, my improved controlled cycle relief valve is shown applied to a system for the transfer of liquefied petroleum gases from a tank car to storage tanks. As shown in the drawing, the relief valve is connected into gas conduit 19 through which gas is pumped from a storage tank 20 by a compressor 21 to a tank car 22 containing liquefied petroleum gases. In a system of the type shown, the gas from the storage tanks is utilized for the purpose of transferring the liquid fuel from the tank car to a second storage tank 23 or in fact the liquid fuel could be transferred to the same tank from which the gas is removed. The tank 23 is connected with the tank car by a conduit 24 which extends below the surface of the liquid contained therein.

In the operation of my improved control cycle relief valve in a system such as that outlined in Figure 2, the compressor 21 pumps gas from the tank 20 in which fuel gas may have been previously stored into tank car 22 forcing liquid out of the tank through conduit 24 to the storage tank 23. If for any reason, the pressure in the conduit 19 between the compressor and tank car should become excessive or exceed a predetermined point at which the relief valve is set, the relief valve will open until flow of gas passing the excess flow valve forces the same into closed position. This will allow the relief valve to close and a small flow of gas will occur through the bleed hole in the excess flow valve to the communicating channel, as shown in Figure 1. As the pressure on opposite sides of the excess flow valve approaches equalization, the excess flow valve will be again forced open by the spring connected thereto. This cycle will repeat until the pressure in the system has receded below the popping pressure of the relief valve. It is thus obvious that by virtue of the present invention a considerable savings of gas is effected inasmuch as the relief valve does not cause the whole storage system to blow down to a low enough pressure to allow the valve to reseat, and at the same time prevents opening of the larger relief valve in the tank car proper, as previously explained herein.

It is to be understood that I do not limit my invention to the particular structure illustrated in the drawing. The idea of controlling the period of discharge of a relief valve, thus limiting the effect of the relief valve blowdown upon the reservoir or storage tank pressure, could obviously be practiced in other ways. Also the two valve devices in question may be located at widely separate points in a common pipe instead of being incorporated in a unitary body the word body in the claims is intended to cover such a body comprised of two or more separate parts either connected together, or connected together by a pipe of suitable extent, so long as the operation of the device is substantially unchanged from the operation set forth herein. Likewise, the check valve can be placed either before the relief valve or after it in the discharge line.

I claim:

1. A reduced blowdown safety relief device comprising a body provided with a passage having an inlet adapted to be connected to a supply of fluid and an outlet adapted to be connected to a region of lower pressure, a spring pressed relief valve normally closing the outlet, an excess flow valve controlling the inlet, spring means normally holding the excess flow valve open, said relief valve being forced open when the pressure in the passage adjacent the relief valve produces a force tending to open the relief valve exceeding the force exerted by the spring, the pressure drop through the conduit with the relief valve open exerting a force on the excess flow valve sufficient to overcome its associated spring means and move the excess flow valve to close the inlet, whereupon the force tending to open the relief valve fails and the spring associated with the relief valve forces the relief valve to close the outlet, and bleed means in the excess flow valve to allow a limited flow of fluid into the passage to equalize the pressure of fluid at the inlet and the pressure in the passage whereupon the spring means opens the excess flow valve.

2. A reduced blowdown safety relief device comprising a body provided with a passage having an inlet adapted to be connected to a supply of fluid and an outlet adapted to be connected to a region of lower pressure, a relief valve normally closing the outlet, a normally open excess flow valve controlling fluid flow in the inlet, the relief valve opening in response to a first predetermined pressure difference between the pressure at an adjacent point in the passage and the pressure adjacent the outlet, the relief valve when open closing only in response to a second predetermined pressure difference between said points substantially lower than said first difference, the excess flow valve closing said inlet in response to flow through said relief valve induced by pressure differences between said points in a continuous range including said first and said second differences, the excess flow valve remaining closed by the pressure difference between the inlet and passage until the pressures at such points are equalized, and bleed means of sufficient size for equalizing the pressure in said inlet and in said passage when the relief valve is closed.

3. A reduced blowdown safety relief device comprising a body provided with a passage having an inlet adapted to be connected to a supply of fluid and an outlet adapted to be connected to a region of lower pressure, a safety relief valve normally closing the outlet, and a normally open excess flow valve movable by flow of fluid through the passage induced by the opening of the relief valve to close the inlet except for a bleed opening, whereby the relief valve will close with reduced blowdown of the pressure of the supply, and the excess flow valve will reopen upon closure of the relief valve.

4. A reduced blowdown safety relief device comprising a body provided with a passage having an inlet adapted to be connected to a supply of fluid and an outlet adapted to be connected to a region of lower pressure, a spring pressed relief valve normally closing the outlet, a fluid flow actuated valve controlling the inlet, spring means normally urging said flow actuated valve open but yielding to allow closure of the inlet except for a bleed opening upon flow through the passage induced by the opening of the relief valve, whereby the relief valve will close with reduced blowdown of the pressure of the supply and the spring means will reopen the flow actuated valve upon closure of the relief valve.

5. A reduced blowdown safety relief device comprising a body provided with a passage having an inlet adapted to be connected to a supply of fluid, and an outlet adapted to be connected to a region of lower pressure, a normally closed safety relief valve controlling flow through one portion of the passage, a normally open excess flow valve controlling flow through another portion of the passage, the relief valve and the excess flow valve being disposed in any serial order in the passage from the inlet to the outlet, the relief valve being adapted to open the passage for flow from inlet to outlet upon a predetermined excess pressure, and the excess flow valve being adapted to be closed by the flow resulting from the opening of the relief valve, and bleed means communicating with the passage on opposite sides of the excess flow valve adapted to equalize the fluid pressure when the relief valve is closed.

ALLEN D. KRUGLER.